United States Patent [19]

Hirahara et al.

[11] Patent Number: 5,006,870

[45] Date of Patent: Apr. 9, 1991

[54] THERMAL RECORDING HEAD

[75] Inventors: Shuzo Hirahara; Kazuhiko Higuchi, both of Kanagawa, Japan

[73] Assignee: Kabushiki Kaisha Toshiba, Kanagawa, Japan

[21] Appl. No.: 248,847

[22] Filed: Sep. 26, 1988

[30] Foreign Application Priority Data

Sep. 30, 1987 [JP] Japan ................................ 62-249034

[51] Int. Cl.[5] ............................................ G01D 15/10
[52] U.S. Cl. ............................................ 346/76 PH
[58] Field of Search ................. 219/216 PH, 543, 552, 219/553; 346/76 PH

[56] References Cited

U.S. PATENT DOCUMENTS 4,723,130 2/1988 Takanashi et al. .................. 219/543

FOREIGN PATENT DOCUMENTS 60-977 1/1985 Japan .
0058877 4/1985 Japan ............................ 217/216 PH
0192566 8/1986 Japan ............................ 219/216 PH
0254358 11/1986 Japan ............................ 219/216 PH

*Primary Examiner*—Bruce A. Reynolds
*Assistant Examiner*—Huan Tran
*Attorney, Agent, or Firm*—Finnegan, Henderson, Farabow, Garrett, and Dunner

[57] ABSTRACT

An improved thermal recording head having a large number of heating elements connected in parallel between a plurality of pairs of electrodes for recording halftone images is provided. Each of the heating elements has end portions divided into two leg sections, and the center portion is narrowed. This configuration allows the thermal recording head to reduce image-roughness to the naked eye. In addition, the variable range of recording density can be significantly expanded.

11 Claims, 6 Drawing Sheets

THERMAL RECORDING HEAD

BACKGROUND OF THE INVENTION

1. Field of the Invention

This invention relates to a thermal recording head, and more particularly to a thermal recording head suitable for recording halftone images by use of a thermal transfer arrangement.

2. Description of the Prior Art

Thermal transfer recording, ink-jet recording and electrophotographic recording are conventional techniques to achieve nonimpact printing for recording images on plain paper. Of these recording techniques, thermal transfer recording has the advantages of maintenance-free apparatus, easy operation, simplified configuration, and colored recording. Thus, the thermal transfer recording technique is widely utilized for printers of personal word processors, graphic printers and the like.

FIG. 6 shows a conventional thermal transfer printer. In FIG. 6, a platen roller 102 is disposed on a thermal recording head 101. Recording paper 103 and an ink ribbon 104 are sandwiched between the head 101 and roller 102. The paper 103 and ink ribbon 104 move together between the platen 102 and the thermal head 101 in the direction of the arrow as the platen roller 102 rotates. Thus, the paper 103 and ink ribbon 104 move at a specified speed in the arrow-marked direction.

FIG. 7 is an enlarged view in detail of a portion of the configuration of thermal recording head 101. In FIG. 7, a large number of very thin heating resistors 101*a* (4 to 16 dots/mm, for example) are respectively connected between a plurality of pairs of electrodes 101*b* and 101*c*. These resistors 101*a* are disposed in a single row, each isolated by insulating elements 101*f*. A large number of driver-transistors 101*e* are respectively connected to the heating resistors 101*a* through corresponding electrodes 101*c*. These transistors 101*e* individually perform ON-OFF control with respect to power supplied from a power source 101*d*. Means not shown, such as a microprocessor plus a driver circuit, are conventionally used to energize transistors 101*e*. Specifically, only specific resistors 101*a* corresponding to images to be recorded are energized to generate heat. As shown in FIG. 6, ink particles of the ink ribbon 104, which are adjacent the selectively energized heating resistors 101*a*, are melted to adhere to the recording paper 103 as the ink ribbon 104 and paper 103 move between the platen 102 and the printing head 101. Thus, ink particles 105 corresponding to images to be recorded are transferred to the paper 103. The other ink particles 104*a*, which are not transferred, remain on the ink ribbon 104.

This thermal printer performs two-valued recording, i.e., whether or not ink particles 104*a* adhere to the recording paper 103. Thus, in order to record halftone images, some particular arrangements are required. For example, a two-valued dither method is usually used. In this method, the dot density within a matrix constituted by (M×N) dots is area modulated to represent (M×N+1) tones corresponding to halftone images.

FIG. 8 shows an example of a four-dot (2×2) matrix for representing a five-tone level according to such a dither method. However, in actual cases, a 4×4-dot matrix through a 8×8-dot matrix are usually used.

However, the two-valued dither method is based on an area modulation to achieve a multi-tone recording. Thus, when the number of tones is increased, the size of the matrix for a given area becomes larger. As a result, the resolution of images is lowered. However, when the size of the matrix is reduced to enhance the resolution, the number of tones is reduced. Namely, to achieve multi-tone recording and high-resolution recording at the same time is difficult.

To solve this problem, the shape of the heating element within a thermal recording head has been improved in the prior art. Thus, only one dot can represent halftone images in an analog fashion. Here, "analog fashion" is understood in the art to mean that a heating element is energized in proportion to the turn-ON periods of the driver-transistor. The turn-On periods are controlled in accordance with the pulse widths of input signals to the driver-transistor. This method was disclosed in Japanese Patent Publications No. 60-78768 and No. 61-241163.

FIG. 9 shows a heating element 200 within a thermal recording head which is disclosed in Japanese Patent Publication No. 60-78768. The heating element 200 is connected between a pair of electrodes 201 and 202. The center of heating element 200 is narrowed to form a double concave-lens shape. As a result, heat generated by the heating element 200 becomes highest at the center where the electric current density is highest. The heat becomes lower towards either electrode. A thermal recording head that incorporates the heating element 200 has characteristics between recording density and recording energy as shown in FIG. 10. Recording energy is proportional to the current through element 200. FIG. 11 shows recorded dot-shapes "a" through "e" printed on the paper which correspond respectively to points "a" through "e" in the graph of FIG. 10.

The areas of recorded dot-shapes "a" through "e" of FIG. 11 are all the same as the area of ink melted by the heating element 200. As shown in FIG. 11, such area expands from a dot-shape at the heating center in a concentric fashion. Thus, when the diameter of the dots becomes greater, the heating element 200 conveys more heat out to the board to which the thermal recording head is attached, i.e., to the side opposite the recording surface. As a result, the recording density does not increase in proportion to the recording energy as shown in FIG. 10. The corners of the pixel remain blank as shown in "e" of FIG. 11. Consequently, the variable range of recording density narrows. Therefore, to extend the range of recording density, the temperature at the heating center must be raised to an extremely high level. However, if the thermal recording head is operated under such a severe condition, its service life is shortened significantly.

Moreover, when an image recording is performed in an analog fashion by use of one-dot unit per pixel, the respective dots within the adjoining pixels appear to couple with each other to the eye of the observer as shown in FIG. 12. This can occur when both adjoining pixels have the dot areas as shown in "c" of FIG. 11. The variations of the adjoining dot areas caused by such unavoidable coupling provide image-roughness to the naked eye. This phenomenon deteriorates the image quality.

On the other hand, FIG. 13 shows a different prior art heating element 300 of a thermal recording head which is disclosed in Japanese Patent Publication No. 61-241163. The heating element 300 is formed in a lattice configuration so that four narrowed sections form the heating portions of the element 300. This heating element 300 is connected between a pair of electrodes 301 and 302.

Because the heating portions of the heating element 300 are dispersed, the variable range of recording density can be expanded. However, the image resolution is lowered. Moreover, the quality of recorded image deteriorates because of image-roughness which is similar to the case of the heating element 200.

SUMMARY OF THE INVENTION

Accordingly, one object of this invention is to provide a thermal recording head having a wide variable range of recording density in proportion to applied recording energy, capable of obtaining halftone images of a high image quality with high image resolution.

Briefly, in accordance with one aspect of the present invention, there is provided a thermal recording head that comprises a plurality of pairs of electrodes and heating elements. The heating elements are provided between the pairs of electrodes. The ends of the heating element to be connected to the pair of electrodes are divided into two sections. The center portions of the heating elements are united.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
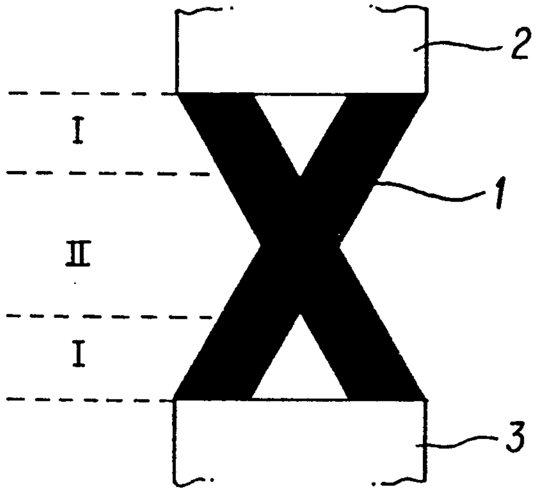
FIG. 1 is a plan view illustrating a thermal recording head according to the preferred embodiment of the present invention.
Figure 6:
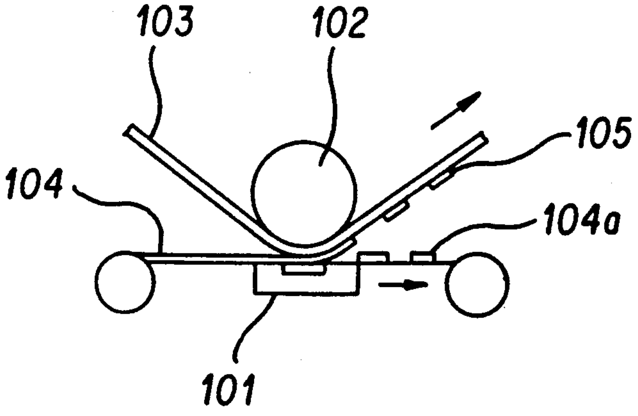
FIG. 6 PRIOR ART
FIG. 6 is a schematic diagram illustrating a thermal transfer printer.
Figure 7:
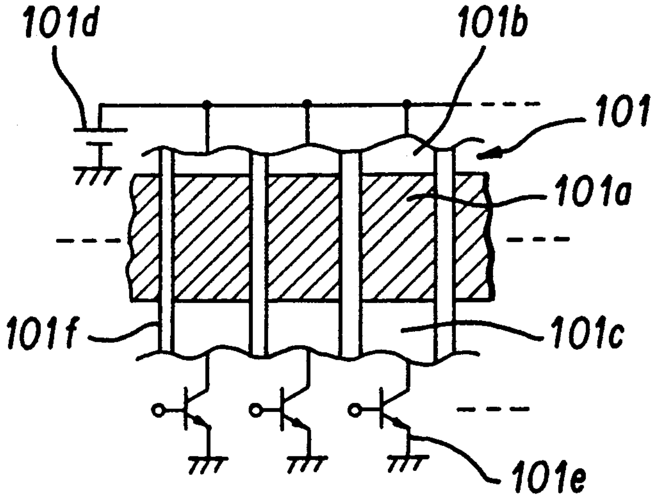
FIG. 7 PRIOR ART
FIG. 7 is a plan view illustrating a partial configuration of a conventional thermal recording head.
Figure 8:
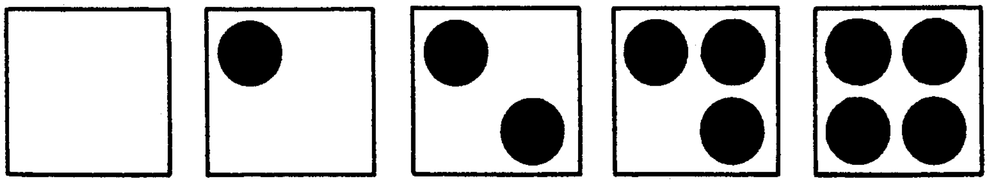
FIG. 8 PRIOR ART
FIG. 8 is a diagram illustrating halftone images produced by a conventional thermal recording head.
Figure 9:
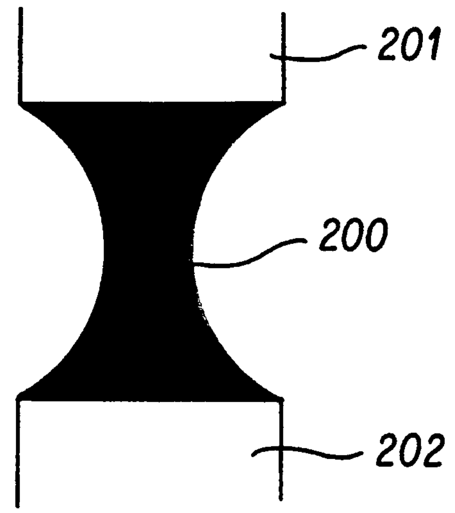
FIG. 9 PRIOR ART
FIG. 9 is a plan view illustrating a heating element of another conventional thermal recording head.
Figure 10:
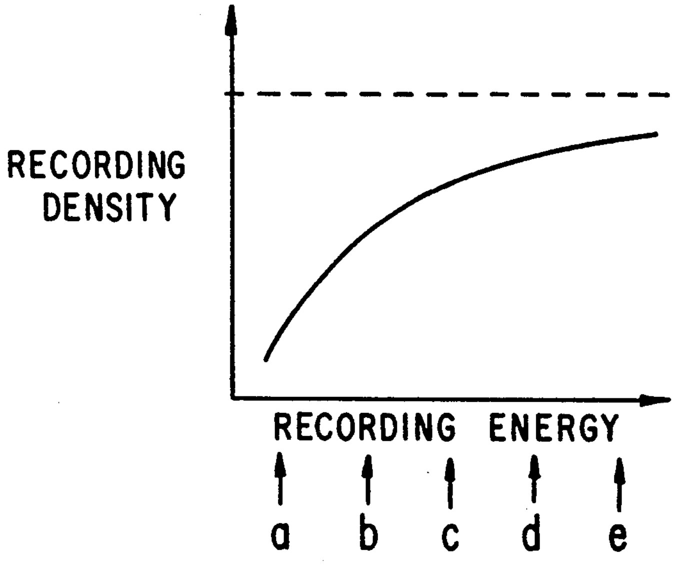
FIG. 10 PRIOR ART
FIG. 10 is a graph illustrating characteristics of recording density versus recording energy for explaining the heating element of FIG. 9.
Figure 11A:
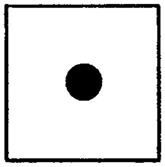
FIG. 11a PRIOR ART
FIGS. 11 *a–e* are diagrams illustrating the shapes of recorded dots in terms of specified recording energy levels "a" through "e" of FIG. 10.
Figure 11B:
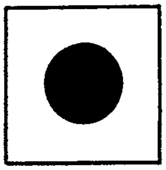
FIG. 11b PRIOR ART
Figure 11C:
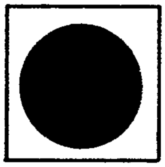
FIG. 11c PRIOR ART
Figure 11D:
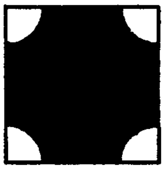
FIG. 11d PRIOR ART
Figure 11E:
FIG. 11e PRIOR ART
Figure 13:
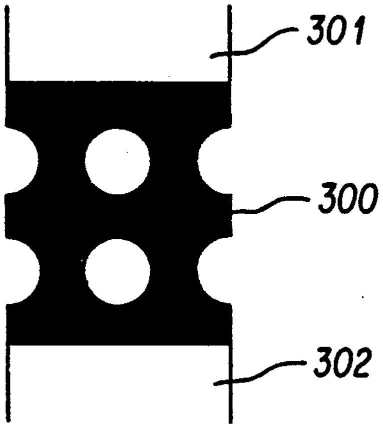
FIG. 13 PRIOR ART
FIG. 13 is a plan view illustrating a heating element of another conventional thermal recording head.

Referring now to the drawings, wherein like reference numerals designate identical or corresponding parts throughout the several views, and more particularly to FIG. 1, the preferred embodiment of this invention will be described. In FIG. 1, reference numeral 1 designates one of a plurality of heating elements for use in a thermal recording head of a thermal transfer printer such as shown in FIGS. 6 and 7. The heating element 1 is connected between a pair of electrodes 2 and 3. Both ends of this heating element 1 are divided into two double legged portions, each of which is respectively connected to the electrodes 2 and 3. The center portion of heating element 1 is narrowed to form an X-shaped configuration. Current density is highest at the narrowed center portion of element 1.

Specifically, each leg of the divided portions of both ends of the heating element 1 is substantially identical in width with the other legs. The distance between the legs of the divided portion of each end of heating element 1 connected to the respective electrodes is substantially equal to the width of each leg. It should be understood that the leg portions of element 1 must have substantially the same widths but can be bent or curved and do not have to be straight as depicted in FIG. 1. Further, the X-shaped heating element 1 is made of material having electrical resistance uniform throughout. Therefore, the current density in the heating element 1 increases in inverse proportion to the widths thereof. In other words, the current density becomes a maximum at the narrowest portion. Thus, also the amount of heat to be generated becomes a maximum at the narrowest portion.

In the two end regions I of FIG. 1, namely, the double legged end portions of the heating element 1, the respective legs have a constant width. Thus, in the two regions I, the divided heating elements equally share the heat which is generated by the current flow. In the region II of FIG. 1, namely, in the narrowed center region, the width becomes narrower towards the center. As a result of this, the heating element 1 generates maximum heat at the narrowest portion, i.e., at the center point.

Figure 2:
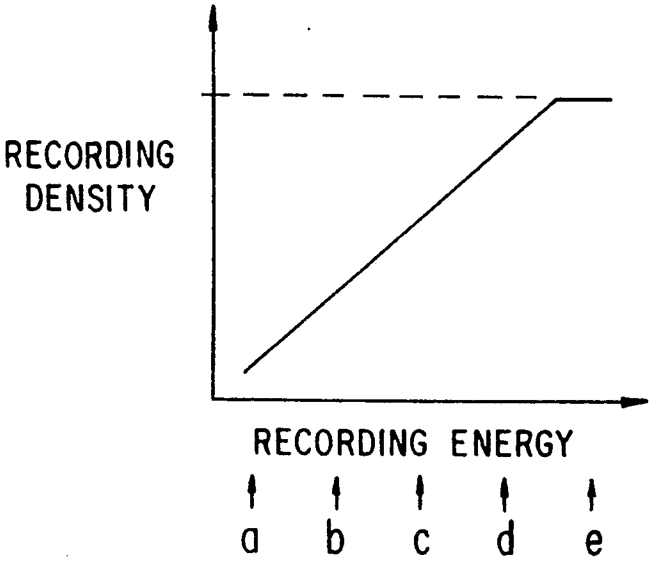
FIG. 2 is a graph illustrating characteristics of recording density versus recording energy for the embodiment of the present invention of FIG. 1.
Figure 3A:
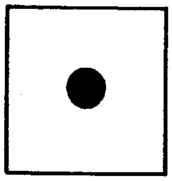
FIGS. 3 *a–e* are diagrams illustrating the shapes of recorded dots in terms of specified recording energy levels "a" through "e" of FIG. 2.
Figure 3B:
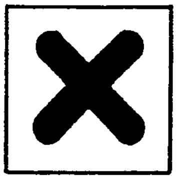
Figure 3C:
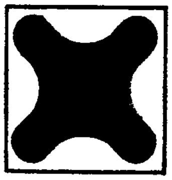
Figure 3D:
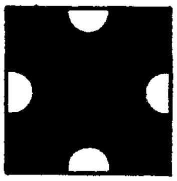
Figure 3E:

A thermal recording head including the heating element 1 of the above-described X-shaped configuration has a substantially linear recording density vs. recording energy relationship, as shown in FIG. 2. The shapes of recorded dots "a" through "e" of FIG. 3 correspond respectively to the recording energy levels "a" through "e" of FIG. 2.

The X-shaped heating element 1 of FIG. 1 is disposed on diagonal lines connected to the respective corners of a square pixel. Further, the center portion of the heating element 1 has the highest current density. Thus, the area of ink melted by the heating element 1 becomes dot-shaped as shown in "a" of FIG. 3 when the recording density is as low as that of the point "a" in FIG. 2. As the recording density increases gradually from point "b" to point "d", the area of ink melted by the heating element 1 expands in the diagonal directions to form a spinning-wheel shape as shown in "b" through "d" of FIG. 3. When the recording density becomes the highest, as at "e" of FIG. 2, the area of ink melted by the heating element 1 further expands to cover the entire area of the square pixel.

In this arrangement, the heating element 1 is disposed on the diagonal lines of the square pixel. Further, the area of ink melted by the heating element 1 expands to form a spinning wheel shape from the center of heat, i.e., the center of the letter X that crosses the entire dot. This is significantly different from the conventional thermal transfer printer in that the area of melted ink expands in a concentric fashion as shown in FIG. 11. Thus, the variable range of recording density becomes wider than that of the conventional thermal transfer printer. Moreover, the image resolution can be enhanced as compared to the conventional arrangement. In addition, the characteristics of recording density have improved to have a substantially linear ralationship with respect to the applied recording energy. Thus, the controllable variable range of recording density can be expanded without putting too heavy a load on the thermal recording head. As a result, the service life of the thermal recording head can be significantly prolonged.

Figure 4:
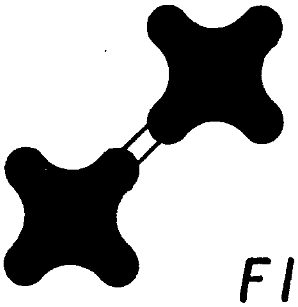
FIG. 4 is a diagram illustrating density fluctuation which appears in the embodiment of the present invention.
Figure 12:
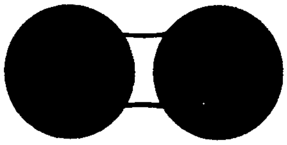
FIG. 12 PRIOR ART
FIG. 12 is a diagram illustrating density fluctuation which appears in the conventional heating element of FIG. 9.

In thermal transfer printing, when the heating element of one-dot unit per one pixel is used to perform recording in an analog fashion, adjoining dots are coupled at the highest recording density. In terms of probabilities, even at the intermediate recording density, a region in which adjoining dots can easily couple with each other could occur. This unstable region corresponds to "c" of FIG. 11 in the case of the conventional arrangement, while in the embodiment of this invention, corresponds to "c" of FIG. 3. As shown in FIG. 12, the portions of dots in the direction of the side partition of the square pixels can appear to the observer to be coupled with each other. When these dots are unstably coupled, random variations of the dot area provide image-roughness to the naked eye, so that the image quality deteriorates. To the contrary, in this embodiment, the adjoining dots are coupled with each other in a diagonal direction in the square pixels as shown in FIG. 4. In this case, the variations of the area of adjoining dots are significantly smaller than that in the conventional arrangement as shown in FIG. 12. Therefore, in this embodiment, halftone images superior in image quality can be obtained with reduced image-roughness to the naked eye.

Figure 5:
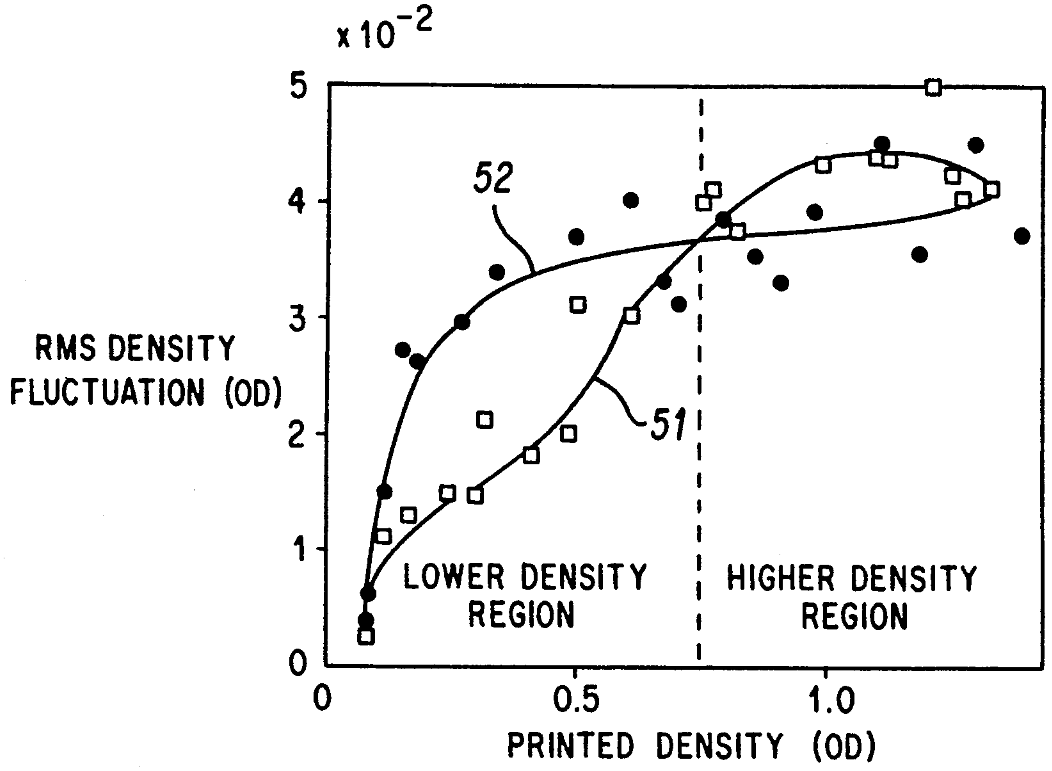
FIG. 5 is a graph illustrating visual characteristics representing advantages of the present invention in comparison with those of the prior art.

FIG. 5 is a graph illustrating the visual characteristics representing advantages of the present invention in comparison with those of the prior art. These were actually measured by the micro-densitometer model PDM-5 type BR measuring instrument manufactured by KONICA. In the graph of FIG. 5, the abscissa represents the printed density of halftone images in terms of optical density (OD). The ordinate represents the root means square (RMS) density fluctuation which means image-roughness in terms of OD. In other words, the density fluctuation represents the actually measured results indicative of the degree of undesirable coupling between printed dots. In the graph, white squares represent the measured values in the case of the thermal recording head according to the present invention. A curve 51 is obtained by plotting these white squares.

The black dots represent the measured values in the case of the conventional thermal recording head comprising a large number of heating resistors of rectangular solid shape shown in FIG. 7. The curve 52 is obtained by plotting these black dots.

As can be seen from this graph, the curve 52 indicates that the density fluctuation which represents image-roughness is relatively larger in the lower density region, and remains substantially unchanged in the higher density region. In contrast, the curve 51 of the present invention indicates that the density fluctuation is relatively smaller in the lower density region, while it increases in the higher density region.

It is a well-known fact that the naked eye is more sensitive to image-roughness in the lower density region than in the higher density region. Therefore, the present invention improves the density fluctuation in the lower density region where it is most important. In this case, the density fluctuation in the higher density region is greater than that of the conventional thermal recording head. However, this does not have any significant adverse effect since the naked eye is not as sensitive to image-roughness in this region of higher printed density.

Obviously, numerous additional modifications and variations of the present invention are possible in light of the above teachings. For example, the size of heating element may be varied, or the materials thereof may be distributed uniformly such that the center portion thereof has the highest current density. It is therefore to be understood that within the scope of the appended claims, the invention may be practiced otherwise than as specifically described herein.

What is claimed is:

1. A thermal recording head comprising:

a plurality of electrode pairs, each of the electrode pairs including a first and a second electrode; and a corresponding plurality of heating elements, each of the heating elements being disposed between a corresponding electrode pair and including first, second and third portions, the first and second portions being coupled to the first and second electrodes, respectively, and the third portion having a center and two ends and being positioned between and connecting the first and second portions, the third portion having a current density that increases from the respective ends towards the center of the third portion and the first and second portions having a uniformly distributed current density upon application of a voltage across the first and second electrodes.

2. The thermal recording head of claim 1, wherein each of the first and second portions includes two spaced leg sections, each of the leg sections coupling the third portion to an associated one of the first and second electrodes.

3. The thermal recording head of claim 2, wherein each of the heating elements has a character X-shaped configuration.

4. The thermal recording head of claim 2, wherein the leg sections of each of the respective first and second portions have substantially equal shape and size.

5. The thermal recording head of claim 1, wherein the heating elements comprise a material having substantially uniform resistance.

6. A thermal recording head comprising:

a plurality of electrode pairs for transmitting current, each of the electrode pairs including a first and a second electrode; and a corresponding plurality of heating elements, each of the heating elements being disposed between a corresponding electrode pair and including first and second end portions connected to the first and second electrodes, respectively, and a center portion having a center and two ends for uniting the end portions, each of said first and second end portions being divided into two spaced leg sections, said leg sections having uniform current density and said center portion having current density that increases from the respective ends of said center portion towards the center of said center portion upon application of a voltage across the first and second electrodes.

7. The thermal recording head of claim 6, wherein each of the heating elements has a character X-shaped configuration.

8. The thermal recording head of claim 6, wherein the leg sections of the first and second end portions have substantially equal shape and size.

9. The thermal recording head of claim 6, wherein the heating elements comprise a material having substantially uniform resistance.

10. The thermal recording head of claim 6, wherein the current densities of the respective first and second end portions are substantially uniform and the current density of the center portion is nonuniform upon application of a voltage across the first and second electrodes.

11. A thermal recording head comprising:

a plurality of electrode pairs, each of the electrode pairs including a first and a second electrode; and a corresponding plurality of heating elements, each of the heating elements being disposed between a corresponding electrode pair and having first and second end portions and a center portion lying along a line in a plane, each of the first and second end portions having two leg sections spaced from one another, each of the leg sections coupling the center portion to an associated one of the first and second electrodes, the current densities of the respective first and second end portions being substantially uniform and the current density of the center portion being nonuniform upon application of a voltage across the first and second electrodes.

* * * * *